(12) United States Patent
Kondo et al.

(10) Patent No.: US 6,665,029 B2
(45) Date of Patent: Dec. 16, 2003

(54) OPTICAL PATH CHANGING FILM AND REFLECTIVE LIQUID-CRYSTAL DISPLAY DEVICE INCLUDING SAME

(75) Inventors: Hiroyuki Kondo, Osaka (JP); Seiji Umemoto, Osaka (JP); Toshihiko Ariyoshi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 69 days.

(21) Appl. No.: 09/986,437

(22) Filed: Nov. 8, 2001

(65) Prior Publication Data

US 2002/0054258 A1 May 9, 2002

(30) Foreign Application Priority Data

Nov. 8, 2000 (JP) ..................... P.2000-340415

(51) Int. Cl.[7] ............. G02F 1/1335; F21V 7/04
(52) U.S. Cl. ............. 349/113; 349/62; 349/63; 362/31
(58) Field of Search .......... 349/61–65, 113; 362/31

(56) References Cited

U.S. PATENT DOCUMENTS

| | | | |
|---|---|---|---|
| 5,818,554 A | | 10/1998 | Hiyama et al. |
| 6,108,059 A | * | 8/2000 | Yang .................... 349/65 |
| 6,151,089 A | * | 11/2000 | Yang et al. ............ 349/113 |
| 6,266,108 B1 | * | 7/2001 | Bao et al. .............. 349/63 |
| 6,340,999 B1 | * | 1/2002 | Masuda et al. ......... 349/63 |
| 2001/0019479 A1 | * | 9/2001 | Nakabayashi et al. ... 362/31 |
| 2003/0001985 A1 | * | 1/2003 | Doe .................... 349/65 |

FOREIGN PATENT DOCUMENTS

| | | |
|---|---|---|
| EP | 0 478 102 A2 | 4/1992 |
| EP | 0 684 423 A2 | 11/1995 |
| EP | 0 867 747 A2 | 9/1998 |
| EP | 0 939 273 A1 | 9/1999 |
| EP | 1 168 045 A2 | 1/2002 |
| JP | 5-158033 | 6/1993 ......... G02F/1/1335 |

\* cited by examiner

Primary Examiner—Tarifur R. Chowdhury
(74) Attorney, Agent, or Firm—Sughrue Mion, PLLC (57) ABSTRACT

An optical film constituted by: a transparent film including a repetitive structure of a plurality of light exit means arranged at intervals of a regular pitch or intervals of irregular pitches in one of opposite surfaces of the transparent film, the repetitive structure of the plurality of light exit means having optical path changing slopes each inclined to the film surface at an inclination angle in a range of from 30 to 48 degrees in order to change an optical path of light from a direction of the film surface into a direction of thickness of the film; and an anti-reflection layer disposed on the film surface in which the plurality of light exit means are formed; wherein the optical film is light-transmissible in the direction of the thickness of the film. A reflective liquid-crystal display device constituted by: a reflective liquid-crystal display panel including at least one light source on one of side surfaces of the liquid-crystal display panel; and the optical film provided on a viewing side of the reflective liquid-crystal display panel so that a surface of the optical film in which a plurality of light exit means are formed faces outward.

10 Claims, 1 Drawing Sheet

OPTICAL PATH CHANGING FILM AND REFLECTIVE LIQUID-CRYSTAL DISPLAY DEVICE INCLUDING SAME

BACKGROUND OF THE INVENTION

1. Field of the Invention

The present invention relates to an optical film efficiently changing the optical path of incident light from a direction of a side surface into a viewing direction so that the optical film can be used to form a reflective liquid-crystal display device which uses a front light, which is thin in thickness and light in weight, and display of which is bright and easy to view.

The present application is based on Japanese Patent Application No. 2000-340415, which is incorporated herein by reference.

2. Description of the Related Art

An external light-illumination reflective liquid-crystal display device further reduced in thickness, size and weight is demanded in order to attain reduction in size and weight of a portable personal computer, a cellular phone, or the like. In the meantime, for a background-art liquid-crystal display device in which a front light using a side type light pipe is provided, however, it has been already difficult to reduce the thickness, size and weight of the liquid-crystal display device any more because a light pipe having a thickness of not smaller than 1 mm is required for light transmission. On the other hand, the same fact about the required thickness as described above is also true of a liquid-crystal display device in which a backlight using a semi-transmission type reflection plate is provided. In addition, in this case, there is a problem that brightness of the liquid-crystal display device using the backlight is inferior to that of an exclusive-use reflective liquid-crystal display device using a reflection layer high in reflectance. This problem is caused because the semi-transmission type reflection plate added to the display device makes bulk and weight larger and viewing in an illumination mode and viewing in an external light mode are dimmed due to dispersion of the light into transmitted light and reflected light through the semi-transmission type reflection plate.

SUMMARY OF THE INVENTION

It is an object of the present invention to develop an optical film changing the optical path of light incident from a direction of a side surface into that in a viewing direction efficiently so that the optical film can be used to form a reflective liquid-crystal display device which uses a front light and which is thin in thickness and light in weight, and display of which is bright and easy to view.

According to the present invention, there is provided an optical film constituted by: a transparent film including a repetitive structure of a plurality of light exit means arranged at intervals of a regular pitch or intervals of irregular pitches in one of opposite surfaces of the transparent film, the repetitive structure of the plurality of light exit means having optical path changing-slopes each inclined to the film surface at an inclination angle in a range of from 30 to 48 degrees in order to change an optical path of light from a direction of the film surface into a direction of thickness of the film; and an anti-reflection layer disposed on the film surface in which the plurality of light exit means are formed; wherein the optical film is light-transmissible in the direction of the thickness of the film. There is further provided a reflective liquid-crystal display device constituted by: a reflective liquid-crystal display panel including at least one light source on one of side surfaces of the liquid-crystal display panel; and the optical film provided on a viewing side of the reflective liquid-crystal display panel so that a surface of the optical film in which a plurality of light exit means are formed faces outward.

In the optical film according to the present invention, the optical film is disposed on the viewing side of a reflective liquid-crystal display panel having at least one light source on one of side surfaces of the liquid-crystal display panel. Hence, the optical path of light incident on the side surface or the optical path of transmitted light of the incident light is efficiently changed into a viewing direction of the liquid-crystal display panel through optical path changing slopes of the optical film, so that the light can be moved inversely after being reflected by a reflection layer. Thus, the light can be utilized for liquid-crystal display in an illumination mode. In addition, flat face portions are provided among the light path changing slopes of the optical film so that external light can be made incident on the optical film efficiently and then the incident light can be moved inversely after being reflected by the reflection layer. Hence, the light can be utilized for liquid-crystal display in an external light mode. As a result, the optical film has little surface reflection and glare of external light due to the surface reflection is prevented from being generated so that the optical film can be used to form an external light-illumination liquid crystal display device which is excellent in reduction in thickness and weight, which is bright and which is good in display quality.

The aforementioned effects chiefly depend on the optical film which makes use of reflection by the slopes to thereby control the optical path of the light. That is, light travelling in a direction of the surface of the film (light incident on the side surface or transmitted light thereof) is reflected by the optical path changing slopes so that the optical path of the light can be changed with good directivity in a direction of the thickness of the film (a viewing direction). Hence, good visibility can be attained in the illumination mode. In addition, the flat face portions can be disposed among the optical path changing slopes easily so that external light can be transmitted through the flat face portions. Hence, sufficient incidence of the external light can be ensured so that good visibility can be attained also in the external light mode. It is difficult to attain the aforementioned effects in a scattering reflection system through a roughened surface formed on a scattering sheet, or the like. Incidentally, Unexamined Japanese Patent Publication No. Hei. 5-158033 suggests a reflective liquid-crystal display device in which illumination light is made to enter a liquid-crystal display panel from one of its side surfaces and totally reflected by a viewing-side cell substrate so that the reflected light is scattered by a roughened-surface type reflection plate so as to be utilized for display.

In this case, however, the light available for display is light made to exit from the panel against the total reflection conditions by scattering. Scattered light generally exhibits a normal distribution with a peak in a regular reflection direction. Accordingly, the display light is inclined to the front (vertical) direction at an angle too large to be effectively utilized for display. As a result, the display is dimmed in the front direction. However, even if diffusing by the roughened-surface type reflection plate is intensified, the quantity of light confined in the panel to be made unable to exit from the panel is increased so that the display is still dimmed. It is therefore necessary in such a roughened-surface scattering reflection system to adjust the intensity of scattering to balance the intensity of scattering in an external light mode with that in an illumination mode. It is however difficult to make the intensity of scattering favorable to both external light and illumination modes because the intensity of scattering required in the former is incompatible with that required in the latter.

On the other hand, in the optical film which uses reflection by the slopes to control the optical path of the light according to the present invention, light exhibiting a peak in the regular reflection direction is chiefly used, and the optical path of the reflected light is controlled. Accordingly, directivity favorable to display, particularly directivity in the frontal direction can be given to the optical film easily so that bright display can be achieved in the illumination mode. Also in the external light mode, good balance between a state favorable to the illumination mode and a state favorable to the external light mode can be ensured easily by use of the flat face portions of the optical film excluding the optical path changing slopes of the light exit means. Further, the anti-reflection layer suppresses surface reflection of the optical film to improve display quality particularly in the external light mode. As a result, the optical film can be used to form an external light-illumination liquid-crystal display device which uses a front light and which is excellent in display quality.

Features and advantages of the invention will be evident from the following detailed description of the preferred embodiments described in conjunction with the attached drawings.

DETAILED DESCRIPTION OF THE PREFERRED EMBODIMENTS

Figure 1A:
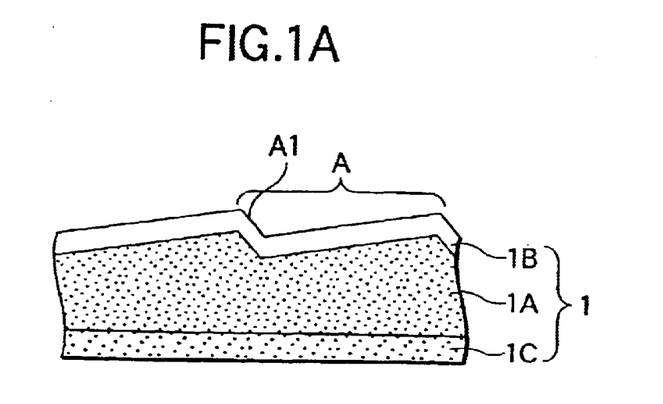
FIGS. 1A and 1B are views for explaining side surfaces of examples of an optical film.
Figure 1B:
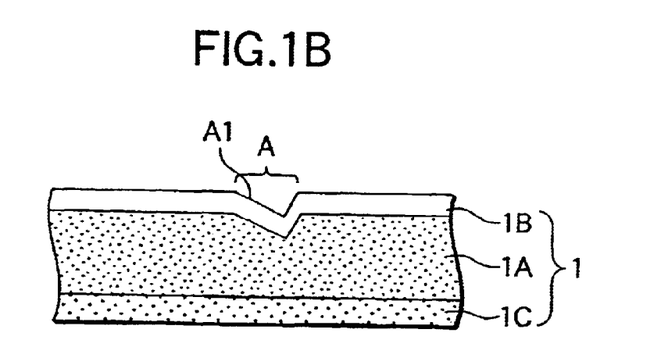

According the present invention, there is provided an optical film constituted by: a transparent film including a repetitive structure of a plurality of light exit means arranged at intervals of a regular pitch or intervals of irregular pitches in one of opposite surfaces of the transparent film, the repetitive structure of the plurality of light exit means having optical path changing slopes each inclined to the film surface at an inclination angle in a range of from 30 to 48 degrees in order to change an optical path of light from a direction of the film surface into a direction of thickness of the film; and an anti-reflection layer disposed on the film surface in which the plurality of light exit means are formed; wherein the optical film is light-transmissible in the direction of the thickness of the film. FIGS. 1A and 1B show examples of the optical film. In each of FIGS. 1A and 1B, the optical film comprises a transparent film 1A, and an anti-reflection layer 1B. The transparent film 1A includes a plurality of light exit means A each having an optical path changing slope A1. Incidentally, the optical film 1 may further comprise an adhesive layer 1C.

Figure 2:
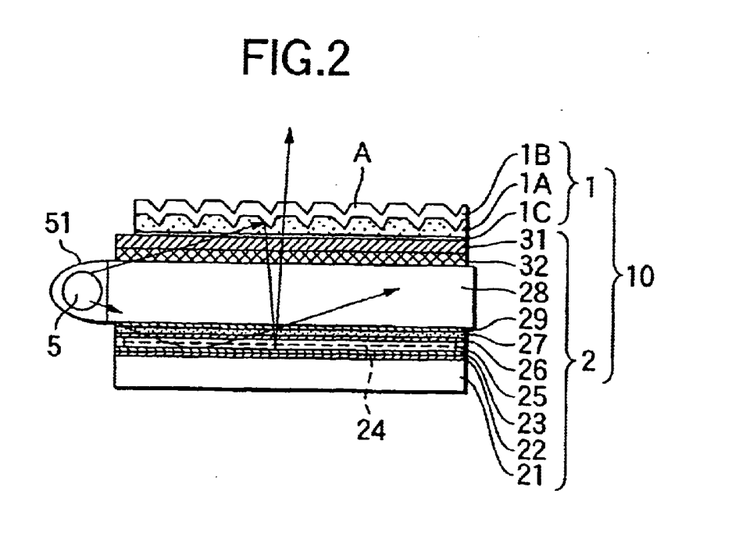
FIG. 2 is a view for explaining a side surface of an example of a reflective liquid-crystal display device which can be used in both an external light mode and an illumination mode.

As shown in FIG. 2, the optical film 1 is disposed on the viewing side of a reflective liquid-crystal display panel having an light source 5 on a side thereof so that the optical film 1 goes along a direction along a surface of the panel while the side in which the plurality of light exit means A are formed faces outward. Light which travels in a direction of the surface of the film and which is constituted by the incident light on the side surface from the light source and the transmitted light of the incident light, is reflected by the optical path changing slopes A1 as shown by the arrows. Then, the optical path of the light is changed toward the surface of the transparent film 1A where no light exit means are provided, accordingly, into the viewing direction of the liquid-crystal display panel which is the direction of the thickness of the film. Hence, the light is made to exit from the transparent film so that the exit light can be utilized as illumination light (display light) of the liquid-crystal display panel, or the like.

The transparent film 1A may be formed out of a suitable material exhibiting transparency in the wave range of light to be made to incident on the transparent film from the light source, or the like. Incidentally, examples of the material used in a visible light range include: transparent resin represented by acrylic resin, polycarbonate resin, cellulose resin, norbornene resin, polyester resin, polyether-sulfone resin, polyamide resin, polyimide resin, polyolefin resin, polyether resin, polyvinyl chloride resin, styrene resin, or the like; curable resin such as acrylic resin, urethane resin, acrylic urethane resin, epoxy resin, silicone resin, or the like, which can be polymerized by heat or by radial rays such as ultraviolet rays, electron rays, and so on.

From the point of view to restrain luminance unevenness or color shading to obtain a liquid-crystal display device low in display unevenness, it is preferable that average in-plane retardation of the transparent film is as small as possible and particularly not larger than 30 nm, and variation in the retardation from place to place in the transparent film is as small as possible. Accordingly, it is preferable that the transparent film is formed out of a material which exhibits no birefringence or small birefringence. Further, internal stress may be produced in the transparent film in a bonding process. From the point of view to prevent a retardation from being produced by the internal stress, it is preferable that the transparent film is made of a material having a low photo-elastic coefficient.

In the case where linearly polarized light enters a liquid-crystal display device through a polarizer or the like having a transparent film with a large retardation, rainbow-coloring due to the change of color, or lowering of the transmission or exit efficiency of the light due to the change of the state of polarization may occur in accordance with the incidence angle and the reflection angle influenced by the retardation. As a result, display unevenness such as luminance unevenness or color shading is apt to occur. Incidentally, ordinary polyester film or the like exhibits a retardation of about 200 nm. A transparent film exhibiting such a small retardation may be formed by a suitable system, for example, by a system in which internal optical strain is eliminated by a system of annealing an existing film.

The preferred system for forming a transparent film is a system in which a transparent film with a small retardation is formed by casting. Incidentally, any transparent film may be used if the retardation condition of the transparent film is satisfactory for display in the range of the available area of the optical film. Further, it is preferable that the aforementioned retardation is based on light in a visible range, particularly on light with a wavelength of 550 nm. The transparent film 1A may be integrally formed as a monolayer body made of one kind of material as shown in each of FIGS. 1A and 1B or may be formed as a laminate of two or more layers made of one kind of resin or different kinds of resins for the purpose of retardation control or the like. The thickness of the transparent film can be determined suitably. From the point of view of reduction in thickness, the thickness of the transparent film is generally set to be not larger than 300 Um, particularly in a range of from 5 to 200 µm, more particularly in a range of from 10 to 100 µm.

From the point of view to attain the foregoing object, the transparent film 1A is provided, on its one side, with a plurality of light exit means A each having a slope A1 by which light travelling in the direction of the surface of the film is reflected so that the optical path of the light is changed in the direction of the thickness of the film as shown in each of FIGS. 1A and 1B. In this case, in the present invention, from the point of view to change the optical path to obtain illumination light excellent in frontal directivity, the transparent film 1A is designed to have a repetitive structure of a plurality of light exit means A which are arranged at intervals of a regular pitch or intervals of irregular pitches and which have optical path changing slopes A1 each inclined to the film surface (plane) at an inclination angle in a range of from 35 to 48 degrees.

FIGS. 1A and 1B show examples of the plurality of light exit means A. In FIG. 1A, the light exit means A are adjacent to one another and constituted-by-prism-like structures each having a combination of an optical path changing slope A1 and a gentle slope having an inclination angle smaller than that of the optical path changing slope A1. On the other hand, in FIG. 1B, each of the plurality of light exit means A has a combination of an optical path changing slope A1 and an elevational face having an inclination angle larger than that of the optical path changing slope A1, and the light exit means A are arranged in a state in which flat faces formed by the film surface are provided between the light exit means.

Although FIGS. 1A and 1B show the case where each of the light exit means A is shaped substantially like a triangle in section, the present invention is not limited thereto. Each of the light exit means A may be formed to have a suitable sectional shape, such as a substantially quadrangular shape, a substantially pentagonal shape or the like, containing the aforementioned optical path changing slope A1. In this case, each of the light exit means A may have two or more optical path changing slopes A1. Incidentally, also when each of the light exit means A is shaped substantially like a triangle in section, the triangle may be constituted by an isosceles triangle containing two optical path changing slopes A1.

As described above, the light exit means may be constituted by convex or concave portions made of equilateral sides or slopes with equal inclination angles, or may be constituted by convex or concave portions each made of a combination of an optical path changing slope and a steep or gentle slope or a slope having an inclination angle different from that of the optical path changing slope. The format of the slopes may be determined suitably in accordance with the number and positions of side surfaces of the liquid-crystal display panel corresponding to side surfaces of the film on which light is made incident. Incidentally, the discrimination between the concave portions and the convex portions is based on whether the light exit means are recessed or protruded relative to the film surface. From the point of view to prevent the light exit means from being damaged or the like, the light exit means preferably have a structure of grooves constituted by concave portions recessed relative to the film surface as shown in FIGS. 1A and 1B.

From the point of view to attain the aforementioned characteristic such as frontal directivity, or the like, it is preferable that the optical film is formed so that the optical path changing slopes A1 face the side surface of the film on which light is incident. Therefore, when light is made incident on two or more side surfaces of the optical film, it is preferable to use an optical film provided with optical path changing slopes A1 corresponding to the number and positions of the side surfaces. In this case, when the light source is made of linear light sources or the like, such opposite arrangement can be achieved, for example, by arranging the optical path changing slopes to be as parallel to the linear light sources or the like as possible, and when the light source is made of point light sources, such opposite arrangement can be achieved, for example, by arranging the optical path changing slopes to be concentric or pit-shaped around the point light source.

In the above description, when there is provided an adjacently repetitive structure of a plurality of light exit means A constituted by prism-like structures each having a combination unit of a short-side optical path changing slope A1 and a long-side gentle slope as shown in FIG. 1A, the following structure is preferred. That is, the projected width of each of the optical path changing slopes on the film surface is set to be not larger than 40 µm, particularly in a range of from 5 to 30 µm. Each of the optical path changing slopes is inclined downward from one side to the opposite side of the transparent film. Each of the gentle slopes is inclined to the film surface at an inclination angle in a range of from 0 (exclusive) to 10 degrees. The difference in angle between any two of the gentle slopes is not larger than 5 degrees, while the difference in inclination angle between adjacent ones of the gentle slopes is set to be not larger than 1 degree. Incidentally, the arrow indicates a direction of transmitting the incident light.

In the aforementioned case, the prism-like structures may be continuous or discontinuous (intermittent) in the ridgeline direction. The pitch of the prism-like structures is preferably set to be in a range of from 50 µm to 1.5 mm. The projected area of the gentle slopes on the film surface is preferably set to be not smaller than 8 times as large as that of the optical path changing slopes. Further, the prism-like structures are preferably formed so that the ridgelines thereof are parallel to one side of the transparent film or intersect the side at an angle in a range of ±35 degrees.

On the other hand, as shown in FIG. 1B, when the light exit means A in a repetitive structure are shaped substantially like triangular discontinuous grooves in section each having a combination of an optical path changing slope A1 and an elevational face opposite to the optical path changing slope A1, it is preferable that the inclination angle of each of the elevational faces with respect to the film surface is set to be not smaller than 48 degrees and that each of the grooves has a length of not smaller than 5 times as large as its width and has a depth set to be in a range of from 2 to 40 µm. In this case, it is further preferable that the light exit means are arranged so irregularly that the area occupied by the light exit means is not smaller than 15% of the area of the film surface in which the light exit means are formed. Incidentally, the length of each of the grooves means the ridgeline direction of the light exit means, and the width of each of the grooves means the film surface direction crossing perpendicularly to the length.

In the above description, the optical path changing slopes A1 play a role in reflection of the light incident on the slopes A1, among incident light on the side surface of the liquid-crystal display panel and transmitted light thereof, to thereby change the optical path of the light. Hence, when the inclination angle of each of the slopes A1 with respect to the film surface is set to be in a range of from 35 to 48 degrees, the optical path of the incident light on the side surface or the optical path of the transmitted light of the incident light can be changed with good perpendicularity to the film surface so that illumination light excellent in frontal directivity can be obtained efficiently.

If the aforementioned inclination angle were smaller than 35 degrees, the optical path of the reflected light would be displaced largely from the frontal direction at an angle of not smaller than 30 degrees. Thus, it would be difficult to use the reflected light effectively for display, and the frontal luminance would be low. On the contrary, if the inclination angle exceeded 48 degrees, light leaking from the optical path changing slopes would increase due to the contrariety to the condition that the incident light on the side surface or the transmitted light thereof is totally reflected. Thus, the efficient utilization of the incident light on the side surface would deteriorate. From the point of view to change the optical path with good frontal directivity or to restrain light leakage, the inclination angle of the optical path changing slopes A1 is preferably in a range of from 38 to 45 degrees, more preferably in a range of from 40 to 43 degrees in consideration of the total reflection conditions based on the refraction of transmitted light by Snell's law, and so on.

The plurality of light exit means A having the optical path changing slopes A1 are formed as a repetitive structure in order to make the optical film thinner. In this case, from the point of view to reflect Light incident on the side surface of the liquid-crystal display panel backward and efficiently transmit the reflected light to the opposite side surface to the reflecting side to thereby emit light from the whole surface of the optical film as uniformly as possible, it is preferable that the structure includes gentle slopes or flat faces. As illustrated in FIG. 1A, each of the gentle slopes maybe inclined to the film surface at an inclination angle of not larger than 5 degrees, particularly not larger than 4 degrees, more particularly not larger than 3 degrees. As illustrated in FIG. 1B, each of the flat faces maybe the film surface formed between the light exit means A. It is therefore preferable that the light exit means A including the elevational faces illustrated in FIG. 1B are formed into a structure in which the angle of each of the elevational faces is set to be not smaller than 48 degrees, particularly not smaller than 55 degrees, more particularly not smaller than 60 degrees, so that the width of the film surface formed between the light exit means can be enlarged.

When the optical film 1 is disposed at the front of the reflective liquid-crystal display panel 2 as illustrated in FIG. 2, the gentle slopes or portions (hereinafter referred to as "flat face portions") constituted by the film surface formed between the light exit means serve as portions through which display light is transmitted in an illumination mode, as portions on which external light-is incident, and as portions through which reflected light of the incident light by the reflection layer 22 is transmitted. Hence, display can be performed both in an illumination mode using the light source and in an external light mode using external light, so that an external light-illumination liquid-crystal display device can be formed. Hence, the transparent film provided with the plurality of light exit means A is formed as a film which is light-transmissible in the direction of the thickness of the film, that is, as a film in which light incident on one of the front and rear surfaces can be made to exit from the other surface.

In the above description, from the point of view to obtain bright display, it is preferable that the projected width (a) of the flat face portions on one surface of the film where the light exit means A are formed is set to be not smaller than 8 times, particularly in a range of from 10 times to 100 times, more particularly in a range of from 15 times to 50 times as large as the projected width of the optical path changing slopes on the same surface of the film, or it is preferable that the occupied area (b) of the flat face portions is set to be not smaller than 15%, particularly in a range of from 20 to 90%, more particularly in a range of from 25 to 80% as large as the whole area of one surface of the film. This is to improve the incidence efficiency of external light and the transmission efficiency of the light reflected by the reflection layer.

The light exit means A are provided so that the optical path changing slopes thereof go in parallel to or are inclined to the side surface of the liquid-crystal display panel on which light is incident. In this case, the light exit means A may be formed continuously from one end to the other end of the transparent film as described above, or may be formed discontinuously and intermittently. When the light exit means A are formed discontinuously, it is preferable that the length of each of the light exit means A is set to be not smaller than 5 times as long as its width from the point of view of the incidence efficiency of transmitted light, the optical path changing efficiency, or the like. In addition, it is preferable that the aforementioned length is set to be not longer than 500 μm, particularly in a range of from 10 to 480 μm, more particularly in a range of from 50 to 450 μm, from the point of view of uniform light emission from the optical film.

Each of the optical path changing slopes or the like forming the light exit means A may take a suitable surface form such as a straight-line surface, a bent surface, a curved surface, or the like. No special limitation is placed on the sectional shape of the light exit means A or the repetitive pitch of the optical path changing slopes A1. The optical path changing slopes A1 are luminance determining factors in the illumination mode. Therefore, the optical path changing slopes A1 can be determined suitably in accordance with the uniformity of light emission from the optical film or the uniformity of light emission in the external light mode in the external light-illumination double mode. Thus, the quantity of optical-path-changed light can be controlled by the distribution density of the optical path changing slopes A1.

Accordingly, the light exit means may include the optical path changing slopes, or the like, with a fixed inclination angle all over the surface of the sheet. Alternatively, in order to cope with absorption loss or attenuation of the transmitted light due to previous change of its optical path so as to attain uniformity of light emission from the optical film, the light exit means A may be formed so that the light exit means is made larger as it goes farther from the side surface on which light is incident. Alternatively, the light exit means A may be made to have a fixed pitch, or may be made to have a pitch reduced gradually as it goes farther from the side surface on which light is incident so that the distribution density of the light exit means A is increased correspondingly. Further, uniform light emission from the optical film may be attained by irregular pitches. Such irregular pitches are advantageous from the point of view to prevent moire caused by the interference between the light exit means A and pixels. Thus, the light exit means A may be formed by the combination of prismatic structures different in shape and so on, in addition to irregular pitches.

When the optical path changing slops A1 overlap with pixels of the liquid-crystal display panel, display may be unnatural due to insufficient transmission of display light. From the point of view to prevent such unnatural display, it is preferable that the overlapping area is made as small as possible, so as to ensure sufficient light transmittance through the flat face portions. In consideration of not only such a point of view but also the fact that the pixel pitch of the liquid-crystal display panel is generally in a range of from 100 to 300 μm, it is preferable that the optical path changing slopes A1 are formed so that the projected width of each of the optical path changing slopes A1 on the film surface is not larger than 40 μm, particularly in a range of from 3 to 20 μm, more particularly in a range of from 5 to 15 μm. Since the coherence length of a fluorescent tube is generally set to about 20 μm, such a projected width is preferable also from the point of view to prevent the display quality from-being deteriorated due to diffraction.

On one hand, from the aforementioned point of view, it is preferable that the optical path changing slopes A1 have large intervals. However, on the other hand, the optical path changing slopes function as substantial functional portions for forming illumination light by changing the optical path of incident light from the side surface as mentioned above. Accordingly, if the interval were too wide, illumination would be sparse at the time of lighting so that display might be unnatural. In consideration of this point, it is preferable that the repetitive pitch of the optical path changing slopes A1 is set to be not larger than 5 mm, particularly in a range of from 20 μm to 3 mm, more particularly in a range of from 50 μm to 1.5 mm.

Incidentally, as described above, the flat face portions are portions through which display light is transmitted. Hence, when the portions are constituted by gentle slopes as shown in FIG. 1A, it is preferable that the angle difference in inclination angle to the film surface between any two of the gentle slopes of the light exit means is set to be not larger than 5 degrees, particularly not larger than 4 degrees, more particularly not larger than 3 degrees, and that the difference in inclination angle between adjacent ones of the gentle slopes is set to be not larger than L degree, particularly not larger than 0.3 degree, more particularly not larger than 0.1 degree. This is to prevent the optimal viewing direction of the reflective liquid-crystal display device, particularly the optimal viewing direction near the frontal direction, from being changed largely by transmission through the gentle slopes, especially from being changed largely between adjacent ones of the gentle slopes.

Further, moire may occur because of interference between the repetitive structure of the light exit means and the pixels of the liquid-crystal display panel. Although prevention of moire can be made by adjustment of the pitch of the repetitive structure, there is a preferred range in the pitch of the repetitive structure as mentioned above. Hence, measures against the case where moire still occurs even though the pitch is in the aforementioned preferred range become a problem. In the present invention, it is preferable that the light exit means are arranged so that the ridgelines of the prism-like structures are inclined to the side surface of the film. Thus, the light exit means can be arrayed across the pixels to prevent moire.

On the aforementioned occasion, if the inclination angle to the side surface were too large, deflection would occur in reflection of the light by the optical path changing slopes A1. As a result, large deviation would occur in the direction of changing the optical path. This would be apt to cause lowering of display quality. From this point of view, the inclination angle of the ridgelines of the light exit means with respect to the side surface is preferably set to be in a range of ±30 degrees, more preferably in a range of ±25 degrees, further preferably in a range of ±20 degrees. Incidentally, the symbol "±" means the direction of inclination of the ridgelines with the side surface as a reference. If the resolution of the liquid-crystal display panel is low enough not to produce moire, or if moire is negligible, it is preferable that such ridgelines are formed to be as parallel with the side surface as possible.

The transparent film having the light exit means can be formed by a suitable method such as: a method in which a thermoplastic resin is pressed against a mold capable of forming a predetermined shape under heating to thereby transfer the shape; a method in which a mold capable of forming a predetermined shape is filled with a hot-melted thermoplastic resin or a resin fluidized by heat or through a solvent; a method in which a fluid resin polymerizable by heat, or by radial rays such as ultraviolet rays, electron rays, or the like, is polymerized in the condition that the fluid resin is cast in a mold capable of forming a predetermined shape or the mold is filled with the fluid resin; or the like.

A preferred method for forming the transparent film having the light exit means is a method in which a repetitive structure of a plurality of light exit means including optical path changing slopes at interval of a regular pitch or intervals of irregular pitches is given to one side surface of the transparent film through a mold having a predetermined structure An example of the method is a method in which one side of a transparent film is coated with a curable resin polymerizable by ultraviolet rays, radial rays or the like, the coating layer cured by irradiation with ultraviolet rays, radial rays or the like while being brought into tight contact with the surface of the mold in which the predetermined structure has been formed, and the transparent film obtained thus is peeled off and withdrawn from the mold.

Hence, the transparent film having the light exit means may be obtained by integral molding in a state in which the transparent film is provided with the light exit means, or may be obtained by a method in which a layer for forming the light exit means is added to one surface of the transparent film. In the latter case, if the difference in refractive index between the light exit means-forming layer to be added and the transparent film is large, the exit efficiency may be lowered greatly due to reflection in interface or the like. From the point of view to prevent such lowering of the exit efficiency, it is preferable that the difference in refractive index between the transparent film and the light exit means-forming layer is made as small as possible.

The particularly preferred refractive index difference is not larger than 0.10, particularly not larger than 0.05. In addition, in this case, it is preferable that the refractive index of the light exit means-forming layer to be added is made higher than that of the transparent film from the point of view of the light exit efficiency. Incidentally, the light exit means-forming layer can be formed out of a suitable material exhibiting transparency for the wave range of the light made incident from the light source or the like, similarly to the transparent film.

The anti-reflection layer 1B provided on a surface of the transparent film 1A where the light exit means A are formed as shown in each of FIGS. 1A and 1B is to-restrain the surface reflection of external light disturbing viewing. Such surface reflection causes glare of external light or lowering of contrast of display light to thereby largely deteriorate viewing particularly in an external light mode. The anti-reflection layer may be formed by a suitable system such as a system in which a coherent vapor-deposited film such as a dielectric multilayer film is formed by an evaporation system, a system in which a low-refractive-index film is formed out of an organic material by a suitable coating system such as a dip coating system or a spray coating system, and so on.

The preferred anti-reflection layer has a reflectance of not higher than 1.5% with respect to perpendicularly incident light with a wavelength of 550 nm. Further, from the point of view of hard coating characteristic for preventing the light exit means from being damaged, it is preferable that the anti-reflection layer is made of a transparent dielectric thin film. As the dielectric, it is possible to use a suitable one in accordance with the background art such as silicon dioxide, titanium dioxide, aluminum oxide, or the like. When thin films made of one kind of dielectric or of different kinds of dielectrics, particularly high-refractive-index layers and low-refractive-index layers are superposed on one another alternately to thereby form a multilayer film, the multilayer film can be formed as an anti-reflection layer having a reflectance of about zero in the whole range of the visual light. From the point of view to prevent the lowering of the function of the light exit means as much as possible, it is preferable that the anti-reflection layer made of a dielectric thin film is attached to a surface of the transparent film by a vacuum evaporation system.

Incidentally, an anti-contamination layer may be provided on the anti-reflection layer, if necessary, in order to prevent the anti-reflection layer from being contaminated with contaminants such as fingerprints and facilitate wiping or removal of the deposited contaminants to thereby protect the functions of the anti-reflection layer and light exit means, and so on. The anti-contamination layer maybe formed suitably as a coating layer of a small surface energy material such as a fluorine-containing resin or the like.

As shown in each of FIGS. 1A and 1B, in the optical film, an adhesive layer 1C may be provided on a surface of the transparent film 1A where the light exit means A are not provided, as occasion demands. Such an adhesive layer is provided to bond the optical film to a support member such as a liquid-crystal display panel or the like. The bonding process of the adhesive layer is to improve reflectance by the optical path changing slopes A1 of the light exit means A and, accordingly, to improve luminance by effectively using incident light on the side surface of the liquid-crystal display panel. The adhesive layer can be formed out of a suitable transparent adhesive agent. From the point of view to simplify the bonding process or the like, a pressure sensitive adhesive layer is preferably used.

A tackiness agent or the like may be used for forming the pressure sensitive adhesive layer. The tackiness agent contains a suitable polymer as a base polymer. Examples of the polymer include rubber, acrylic, vinyl alkyl ether, silicon, polyester, polyurethane, polyether, polyamide, styrene, etc. Particularly, it is preferable to use a tackiness agent superior in transparency, weather resistance, heat resistance, and so on, such as an acrylic tackiness agent in which a polymer mainly containing acrylic or methacrylic alkyl ester is used as a base polymer. From the point of view to prevent light from being confined in the optical film due to interface reflection caused by the refractive index difference and to prevent the light from being unable to exit from the optical film to thereby restrain the quantity of light loss generated by the light unable to exit from the optical film, a pressure sensitive adhesive layer in which the refractive index difference between the transparent film and the pressure sensitive adhesive layer is not larger than 0.12, particularly not larger than 0.10, more particularly not larger than 0.05 is preferably used.

The pressure sensitive adhesive layer may be formed to contain one or two or more kinds of suitable transparent particles such as inorganic particles, which maybe conductive, such as silica, alumina, titania, zirconia, tin oxide, indium oxide, cadmium oxide, antimony oxide or the like, or organic particles of crosslinked or non-crosslinked polymer or the like. In this case, the pressure sensitive adhesive layer can be formed to be of a light diffusing type. Incidentally, in order to prevent the tack layer from being contaminated with foreign matters, it is preferable that the pressure sensitive adhesive layer is temporarily covered with a peel sheet until the pressure sensitive adhesive layer is put into practical use. Further, for the same reason as described above, it is preferable that the refractive index difference between the pressure sensitive adhesive layer and the support member such as a liquid-crystal display panel to be bonded to the pressure sensitive adhesive layer is not larger than 0.15, particularly not larger than 0.10, more particularly not larger than 0.05.

The optical film according to the present invention uses the optical path changing slopes to change the optical path of the incident light on the side surface of the liquid-crystal display panel from an light source, or the like, or the optical path of the transmitted light of the incident light into a direction which is favorable to visibility and excellent in perpendicularity. Thus, the light is made to exit with high efficiency in light utilization. In addition, the optical film exhibits excellent transmittance to external light. Thus, when the optical film is disposed on the viewing side (front) of the reflective liquid-crystal display panel 2 having one or two or more light sources 5 on one or two or more side surfaces of the display panel 2 as shown in FIG. 2, it is possible to form various devices such as an external light-illumination reflective liquid-crystal display device which is bright, easy to view and superior in low power consumption.

Incidentally, for example, as shown in FIG. 2, the reflective liquid-crystal display device can be formed when the optical film 1 is provided on the viewing side of the reflective liquid-crystal display panel 2 having the light source 5 on its side surface while the light exit means A-forming side of the optical film 1 faces outward. In FIG. 2, the reflective liquid-crystal display panel is constituted by cell substrates 21 and 28, electrodes 22 and 27, alignment films and 26, liquid crystal 24, a sealing member 25, a low-refractive-index transparent layer 29, a polarizer 31, and a phase retarder 32. The reference numeral 51 designates a reflector. Incidentally, in FIG. 2, the electrode 22 serves also as a reflection layer.

According to the reflective liquid-crystal display device 10 using a front light as shown in FIG. 2, incident light on the side surface of the viewing-side cell substrate 28 from the light source 5 is reflected on the basis of the law of refraction, and transmitted backward as represented by the arrows in FIG. 2. Then, the optical path of the light incident on the optical path changing slopes A1 of the optical film 1 disposed on the viewing side is efficiently changed into the backward direction reverse to the viewing direction. The other part of light which is not incident on the optical path changing slopes A1 is transmitted backward by total reflection so as to be incident on the optical path changing slopes A1 in the back portion. Thus, the optical path of the light is efficiently changed into the backward direction reverse to the viewing direction. Then, the light having its optical path changed is reflected by the electrode 22 which is provided in the liquid-crystal cell and which serves also as a reflection layer. The light inverted by the reflection is made to exit from the flat face portions of the optical film, so that display excellent in brightness can be achieved.

In the above description, as the liquid-crystal display panel 2, it is possible to use a suitable reflective one which has at least a liquid-crystal cell, that is, it is possible to use a liquid-crystal display panel at least having a reflection layer, and a liquid-crystal cell in which liquid crystal 24 is encapsulated by a sealing member 25 between the cell substrates 21 and 28, as illustrated in FIG. 2. In this case, incident light on the side where the optical film 1 is disposed is inverted by use of the reflection layer and made to exit as display light through the control of the liquid crystal or the like. No special limitation is placed on the kind of the liquid-crystal display panel.

Incidentally, specific examples of the liquid-crystal cell described above are: a twisted or non-twisted liquid-crystal cell such as a TN liquid-crystal cell, an STN liquid-crystal cell, an IPS liquid-crystal cell, an HAN liquid-crystal cell, an OCB liquid-crystal cell, or a VA liquid-crystal cell; a guest-host or ferroelectric liquid-crystal cell; a light-diffusing type liquid-crystal cell; and so on. A system for driving the liquid crystal may be also a suitable one, such as an active matrix system, a passive matrix system, or the like. The liquid crystal is typically driven through the transparent electrode 27 or reflective electrode 22 provided inside the pair of cell substrates 21 and 28 as illustrated in FIG. 2.

As for the cell substrate, a suitable substrate made of glass, resin, or the like, may be used. Particularly, the viewing-side substrate is preferably made of an optically isotropic material from the point of view of display quality or the like. In addition, from the point of view to improve luminance, display quality, or the like, a material such as a no-alkali glass plate superior in colorlessness and transparency to a blue glass plate is preferably used as the viewing-side substrate. Further, a resin substrate is preferably used from the point of view of lightweight properties or the like. The thickness of the cell substrate is not limited specially, but may be determined suitably in accordance with the intensity of encapsulating the liquid crystal or the like. Generally, from the point of view of the balance between the light transmission efficiency and the thin and lightweight properties, the thickness is set to be in a range of from 10 $\mu$m to 5 mm, particularly in a range of from 50 $\mu$m to 2 mm, more particularly in a range of from 100 $\mu$m to 1 mm.

When the liquid-crystal cell is formed, one or two or more suitable functional layers such as an alignment film composed of a film subjected to rubbing for aligning the liquid crystal, a color filter for color display, and so on, may be provided in accordance with necessity. Incidentally, as shown in FIG. 2, alignment films 23 and 26 are generally formed on the electrodes 22 and 27 respectively, and a color filter not shown in FIG. 2 is generally provided between one of the cell substrates 21 and 28 and corresponding one of the electrodes.

The reflection layer may be disposed in the liquid-crystal cell by the electrode 22 or the like as shown in FIG. 2, or may be disposed outside the back side (the side opposite to the viewing side) cell substrate 21. The reflection layer may be formed out of a suitable material such as a white sheet according to the background art. Especially, a reflection layer high in reflectance is preferred. Examples of the preferred reflection layer are: a coating layer containing powder of a high-reflectance metal such as aluminum, silver, gold, copper, chromium, or the like, or powder of an alloy of such a high-reflectance metal in a binder resin; a layer in which such a metal or a dielectric multilayer film is deposited by a suitable thin film-forming system-such as a vacuum evaporation system, a sputtering system, or the like; a reflection sheet having such a coating or deposited layer supported by a base material composed of a film or the like; a sheet of metal foil; and so on.

Incidentally, in the above description, in the type in which the reflection layer is disposed outside of a liquid-crystal cell, in order to make it possible to transmit display light, the cell substrates and electrodes on both the viewing side and the back side are required to be formed as transparent substrates and transparent electrodes. On the other hand, in the type in which the reflection layer is provided in a liquid-crystal cell as shown in FIG. 2, in order to make it possible to transmit display light in the same manner as described above, the cell substrate 28 and the electrode 27 on the viewing side are required to be formed as a transparent substrate and a transparent electrode, but the substrate 21 and the electrode 22 on the back side may be, however, formed as an opaque substrate and an opaque electrode because they are not used for transmitting display light.

In the liquid-crystal display panel, the crystal cell may be additionally provided with one or two or more suitable optical layers such as a polarizer 31,-a phase retarder 32, a light diffusing layer, and so on, as illustrated in FIG. 2. The polarizer is provided for attaining display by utilizing linear polarized light, while the phase retarder is provided for improving display quality by compensating for the retardation caused by the birefringence of the liquid crystal, or the like. On the other hand, the light diffusing layer is provided for enlarging the display range by diffusing display light, for achieving uniformity of luminance by leveling bright-line-like emission light through the optical path changing slopes of the optical film, for increasing the quantity of incident light on the optical film by diffusing transmitted light in the liquid-crystal display panel, and so on.

As shown in FIG. 2, a transparent layer 29 low in refractive index may be provided on the inner side of the viewing-side cell substrate in accordance with the necessity. When incident light from the light source 5 is transmitted in the inside of the viewing-side cell substrate 28, the transmitted light is totally reflected by the low-refractive-index transparent layer 29 because of the refractive index difference between the substrate 28 and the transparent layer 29 so that the light is confined in the viewing-side cell substrate efficiently. Hence, the transmitted light is transmitted backward efficiently so as to be supplied uniformly even to the optical path changing slopes of the light exit means located in the position far from the light source. Thus, the low-refractive-index transparent layer 29 is to improve uniformity of brightness on the whole of the display screen by changing the optical path of the light through reflection.

The low-refractive-index transparent layer is also provided for preventing the transmitted light from being reduced or made uneven on the basis of the partial change of the transmission state because the transmitted light suffers birefringence or scattering when the transmitted light enters the liquid-crystal layer. That is, the low-refractive-index transparent layer is provided for the purpose of preventing the display from being dimmed and preventing the display quality from being deteriorated because the display in a neighbor of the light source is subjected to ghosting in the back portion. Further, in the case where a color filter or the like is disposed, the low-refractive-index transparent layer is provided for preventing the transmitted light from being rapidly absorbed to the color filter to thereby avoid reduction of the transmitted light.

The low-refractive-index transparent layer may be formed as a layer having a refractive index lower than that of the viewing-side cell substrate. The low-refractive-index transparent layer can be made of a suitable material such as an inorganic or organic low-refractive-index dielectric by a suitable system such as a vacuum evaporation system, a spin coating system or the like. The material and the system for forming the low-refractive-index transparent layer are not limited specifically. From the point of view to achieve backward transmission efficiency by total reflection or the like, it is preferable that the refractive index difference between the transparent layer and the cell substrate is as large as possible. It is preferable that the refractive index difference is not smaller than 0.05, especially in a range of from 0.1 to 0.5.

It is further preferable that the low-refractive-index transparent layer has a refractive index lower than that of the transparent film having the light exit means formed therein. If the refractive index of the light exit means were lower than that of the transparent layer, incident light from the light source or transmitted light thereof would be apt to be confined in the viewing-side cell substrate. Hence, incidence of the light on the light exit means would be disturbed so that it might be difficult to use the light as display light. As the preferred configuration from the point of-view to attain bright display, the refractive index of the transparent film having the light exit means is made higher than that of the viewing-side cell substrate so that the refractive index difference between the transparent film and the viewing-side cell substrate is not larger than 0.15, particularly not larger than 0.10, more particularly not larger than 0.05.

The position of arrangement of the low-refractive-index transparent layer can be determined suitably. The low-refractive-index transparent layer is preferably positioned between the cell substrate and the transparent electrode from the point of view to attain the aforementioned transmitted light confinement effect, to prevent the transmitted light from entering the liquid-crystal layer, and soon. When a color filter is disposed between the cell substrate and the transparent electrode, the low-refractive-index transparent layer is preferably positioned nearer the cell substrate than the color filter from the point of view to prevent the absorption loss of the transmitted light from being caused by the color filter. Therefore, the low-refractive-index transparent layer 29 is generally provided directly on the viewing-side cell substrate 28.

If the low-refractive-index transparent layer were too thin, the confinement effect might be reduced because of a wave effusion phenomenon. Therefore, the low-refractive-index transparent layer is preferably selected to be as thick as possible from the point of view to sustain the total reflection effect. The thickness can be determined suitably from the point of view of the total reflection effect or the like. Generally, the thickness is selected preferably to be not smaller than a quarter wavelength (95 nm), more preferably to be not smaller than a half wavelength (190 nm), further preferably to be not smaller than one wavelength (380 nm), still further preferably to be not smaller than 600 nm, on the basis of the optical path length calculated by multiplying refractive index by layer thickness, from the point of view of the total reflection effect on the visible light with the wavelength in a range of from 380 nm to 780 nm, particularly on the light with the short-wave side wavelength 380 nm.

Incidentally, when the cell substrate is used as a substrate for transmitting incident light from the light source as described above, it is favorable that the sectional area of the cell substrate is as large as possible, that is, it is preferable that the cell substrate is as thick as possible, from the point of view of incidence efficiency, transmission efficiency, or the like. On the other hand, from the point of view to reduce thickness and weight of the cell substrate, it is favorable that the cell substrate on the side where the light source is not provided is as thin as possible. Therefore, the thickness of the viewing side transparent substrate and the thickness of the back side transparent substrate may be equal to each other or may be different from each other. Incidentally, each of the substrates may have a uniform thickness or the viewing-side cell substrate in particular may be shaped like a wedge in section so that the thickness thereof changes partially for the purpose of improving efficiency of incidence of transmitted light onto the optical path changing slopes on the basis of the inclination arrangement of the light exit means.

The plan size of the viewing-side cell substrate and the plan size of the back-side cell substrate may be also equal to each other or may be different from each other. When the viewing-side cell substrate is used as a substrate for transmitting incident light from the light source, as shown in FIG. 2, it is preferable that the side surface of the viewing-side cell substrate 28 is protruded more greatly than the side surface of the back-side cell substrate 21 at least on the side surface where the light source 5 is disposed, from the point of view of efficiency of incidence, or the like, in the case where the light source is disposed on the protruded side surface.

The transparent electrode to be provided on each cell substrate may be made of a suitable material such as ITO or the like according to the background art. On the other hand, the electrode which is provided on the back-side cell substrate and which serves also as a reflection layer can be formed out of, for example, a suitable reflective metal or the like. It is preferable that the electrode is formed as a thin film made of a high-reflectance good-electrically-conductive metal such as aluminum, or the like. In this case, when the viewing-side cell substrate is used as a substrate for transmitting incident light from the light source, the substrate may be provided as a scattering reflection layer because transmitted light in the substrate hardly reaches the reflection layer until the light is reflected by the optical path changing slopes of the light exit means to thereby prevent the transmitted light from being disordered due to scattering reflection.

When reflected light is diffused by a reflection surface exhibiting a light-scattering function, improvement of frontal directivity can be attained. When the reflection layer is formed by a surface roughening process, the reflection layer can prevent the production of Newton rings due to close contact to thereby improve visibility. Hence, the reflection layer provided outside the cell may be put and superposed simply or may be disposed in a close contact state by a bonding system, an evaporation system, or the like.

The formation of the light-scattering type reflection layer can be made by a system, for example, comprising the steps of: forming a surface of a film base material as a fine prismatic structure by a suitable system such as a surface roughening system using sandblasting, matting, or the like, or a particle adding system; and providing a reflection layer on the film base material so that the fine prismatic structure is reflected in the reflection layer. The reflection layer having such a fine prismatic structure to reflect the fine prismatic structure on the surface of the film base material can be formed by a system such as a system in which a metal is attached onto a surface of the film base material by a suitable evaporation or plating system such as a vacuum evaporation system, an ion-plating system, a sputtering system, or the like.

Incidentally, as the polarizer 31 used for forming the liquid-crystal display panel, it is possible to use a suitable one without imposing any special limitation. From the point of view to obtain display with a-good contrast ratio by use of the incidence of highly linearly polarized light, a polarizer with a high degree of polarization can be preferably used. Examples of the material of the polarizer are: an absorption type polarizing film formed in such a manner that a dichromatic substance such as iodine, dichromatic dye, or the like, is adsorbed to a hydrophilic polymeric film such as a polivinyl alcohol film, a partially formalized polivinyl alcohol film, or a partially saponified ethylene-vinyl acetate copolymer film, and orienting the film; a polarizing film in which a transparent protective layer is provided on one or each of opposite sides of the aforementioned absorption type polarizing film; or the like.

The formation of the aforementioned transparent protective layer is preferably performed by use of a material superior in transparency, mechanical strength, thermal stability, moisture sealability, and so on. Examples of the material include: polymer such as acetate resin, polyester resin, polyether-sulfone resin, polycarbonate resin, polyamide resin, polyimide resin, polyolefin resin, acrylic resin, polyether resin, polyvinyl chloride resin, styrene resin, or norbornane resin; thermal-curable or ultraviolet-curable resin such as acrylic resin, acrylic-urethane resin, epoxy resin, silicone resin, or the like; etc. The transparent-protective layer may be attached by a system such as a bonding system using the form of a film, a coating system using the form of a polymer solution or the like, and so on. Incidentally, the polarizer may be provided on each of opposite sides of the liquid-crystal cell or may be provided on only one side of the liquid-crystal cell as shown in FIG. 2.

On the other hand, as the phase retarder, it is possible to use a suitable material such as a birefringent film obtained in such a manner that a film composed of a suitable polymer as listed in the description for the transparent protective layer is oriented by a suitable system such as a uniaxal or biaxial orientation system or the like, an alignment film of a suitable liquid-crystal polymer such as a nematic or discotic liquid-crystal polymer or the like, an alignment film having an alignment layer supported by a transparent base material, or the like. The refractive index of the phase retarder in the direction of the thickness thereof may be controlled under the action of heat-shrinking force of a heat-shrinkable film. The compensating phase retarder 32 is generally disposed between the viewing side or/and back side polarizers 31 and the liquid-crystal cell in accordance with the necessity as shown in FIG. 2. As the phase retarder, it is possible to use a suitable one in accordance with the wave range or the like. In addition, the phase retarder may be used in the form of two or more layers superposed on each other in order to control optical characteristic such as a retardation or the like.

The light source disposed on the side surface of the liquid-crystal display panel is provided so that light used as illumination light for the reflective liquid-crystal display device is made incident on the side surface of the liquid-crystal display panel. Thus, the reflective liquid-crystal display device can be made thin in thickness and light in weight in combination with the light source and the plurality of light exit means disposed on the viewing side of the panel. The preferred system for arranging the light source from the point of view to prevent incident light from the light source from entering the liquid-crystal layer is a system in which the light source is disposed on the side surface of the viewing-side cell substrate, particularly the side surface of the viewing-side cell substrate protruded more greatly than the side surface of the back-side cell substrate.

As the light source, it is possible to use a suitable one. Preferred examples of the light source include: a linear light source such as a (cold or hot) cathode tube or the like; a point light source such as a light-emitting diode or the like; an array in which such point light sources are set in a linear or planar array or the like; a combination of a point light source and a linear light pipe through which incident light from the point light source is converted into light of a linear light source; and so on. The light source or light sources may be disposed on one or two or more side surfaces of the liquid-crystal display panel. When light sources are disposed on two or more side surfaces, the plurality of side surfaces may be constituted by a combination of opposite side surfaces, by a combination of side surfaces intersecting crosswise vertically and horizontally or by a combination of three or more side surfaces in use of both the aforementioned combinations.

Lighting of the light source allows visibility in an illumination mode. When visibility is made in an external light mode, the light source is made switchable because it is unnecessary to light the light source. As the switching system, it is possible to use any desirable one. Any background-art system may be used as the switching system. Incidentally, the light source may be of a multi-color light emission system which can switch its own emission color. Alternatively, different colors of light may be emitted through different kinds of light sources.

In accordance with necessity, as illustrated in FIG. 2, the light source 5 may be formed as a combined body in which a suitable assisting means such as a reflector 51 or the like is disposed to surround the light source 5 to guide divergent light to the side surface of the liquid-crystal display panel. As the reflector, it is possible to use a suitable reflective sheet such as a resin sheet provided with a high-reflectance metal thin film, a white sheet, a metal foil sheet, or the like, so that light is reflected by the reflection sheet at least on the light source side. The reflector may be used as a retention means also having a function of surrounding the light source in such a manner that end portions of the reflector are bonded to end portions of upper and lower surfaces of a cell substrate of the liquid-crystal display panel, that is, to end portions of upper and lower surfaces of the viewing-side substrate.

As described above, the light-diffusing layer may be disposed in the reflective liquid-crystal display device. The light-diffusing layer may be provided by a suitable system according to the background art using a coating layer, a diffusing sheet, or the like, having a surface fine prismatic structure based on mixing of transparent particles. The position of arrangement of the light-diffusing layer can be determined suitably but it is generally preferable from the point of view of stability of display quality or the like that the light-diffusing layer is disposed between the optical film and the cell substrate. In this case, the light-diffusing layer may be formed as a light-diffusing type adhesive layer mixed with transparent particles so that the light-diffusing layer serves also as an adhesive layer for bonding the optical film or as an adhesive layer for bonding the polarizer and the phase retarder in order to attain reduction in thickness of the liquid-crystal display device. Hence, one light-diffusing layer or two or more light-diffusing layers may be arranged.

Incidentally, optical devices or parts such as an optical film, a liquid-crystal cell, a polarizer, a phase retarder, etc. for forming the reflective liquid-crystal display device may be wholly or partially integrally laminated/fixed onto one another or may be disposed in an easily separable state. From the point of view to prevent lowering of contrast based on suppression of interface reflection, or the like, it is preferable that such optical devices or parts are fixed onto one another. A suitable transparent adhesive agent such as a tackiness agent can be used for the fixing/adhering process. The transparent adhesive layer may be made to contain the aforementioned transparent particles or the like so as to be used as an adhesive layer exhibiting a diffusing function, or the like. In addition, the aforementioned optical devices or parts, particularly those on the viewing side may be made to have ultraviolet absorptive power, for example, by a system for treating them with an ultraviolet absorbent such as a salicylic ether compound, a benzophenone compound, a benzotriazole compound, a cyanoacrylate compound, a nickel complex compound, or the like.

EXAMPLE 1

A mold processed into a predetermined shape in advance was filled with an acrylic ultraviolet-curable resin (ARONIX UV-3701, made by TOAGOSEI Co., Ltd.) by dropping with a dropper. A triacetylcellulose (TAC) film 80 μm thick (surface-saponified substance, refractive index: 1.49) lay quietly on the resin and was made into close contact with the resin by a rubber roller so that excessive resin and bubbles were removed. The resin was irradiated with ultraviolet rays by a metal halide lamp and cured. Then, the film with the resin was peeled off from the mold and cut into a predetermined size. Thus, a transparent film having a plurality of light exit means with a refractive index of 1.51 was obtained. Thin films of silicon dioxide and thin films of titanium dioxide were superposed alternately on one surface of the transparent film in which the plurality of light exit means were formed by a vacuum evaporation system. Thus, the transparent multilayer film was formed as an anti-reflection film. Then, a pressure sensitive adhesive layer with a refractive index of 1.47 was attached to the other surface of the transparent film in which the light exit means were not provided. Thus, an optical film was obtained.

Incidentally, the optical film was 60 mm wide and 45 mm long, and had prism-like concave portions constituted by continuous grooves disposed at intervals of a pitch of 210 μm. Each of the continuous grooves was shaped substantially like a triangle in section and had a depth in a range of from 8 to 13 μm. The ridgelines of the grooves were parallel with the widthwise direction. Each of the grooves was constituted by an optical path changing slope A1 and a gentle slope. The optical path changing slope A1 was inclined at an inclination angle in a range of from 42.5 to 43 degrees. The gentle slope was inclined at an inclination angle in a range of from 2.2 to 3.8 degrees. The difference in inclination angle between adjacent ones of the gentle slopes was not larger than 0.1 degree. The area occupied by the optical path changing slopes A1 in one surface of the film was 6.7% of the area occupied by the gentle slopes in the surface of the film. The reflectance of the anti-reflection layer was about 0% in the whole range of the visible light.

Then, polarizers were bonded to opposite sides of a twisted nematic liquid-crystal cell through pressure sensitive adhesive layers respectively. A light-scattering type silver reflection plate was bonded to the back side polarizer through a pressure sensitive adhesive layer to thereby form a normally white reflective liquid-crystal display panel. Then, the optical film was bonded onto the viewing side polarizer through a pressure sensitive adhesive layer while the surface in which the plurality of light exit means were formed was made to face outward. Then, a cold-cathode tube was disposed on a side surface of the panel, and surrounded by a silver-deposited polyester film. The opposite end portions of the film were bonded to the upper and lower surfaces of the panel respectively by pressure sensitive adhesive double coated tape so that the cold-cathode tube was retained/fixed to the side surface. Thus, an external light-illumination reflective liquid-crystal display device using a front light was obtained. Incidentally, the optical film was disposed so that the ridgeline direction of the light exit means of the optical film was parallel with the cold-cathode tube and so that the optical path changing slopes faced the cold-cathode tube.

EXAMPLE 2

A mold different in shape was used to obtain a transparent film which was 60 mm wide and 45 mm long. The transparent film had a plurality of light exit means shaped substantially like triangular grooves in section. Each of the groove has a length of 80 μm and a depth of 8 μm, and was constituted by a combination of an optical path changing slope inclined at an inclination angle of about 43 degrees and an elevational face inclined at an angle of 75 degrees. The grooves were arranged so irregularly that the distribution of the plurality of light exit means formed into discontinuous ridgelines approximately parallel with the widthwise direction became denser as it went farther from a light source which was to be disposed. An optical film and an external light-illumination reflective liquid-crystal display device using a front light were obtained in the same manner as in Example 1 except that the transparent film was used. Incidentally, sections of the plurality of light exit means were observed by a microscope. As a result, the sections were uniform in shape. Flat faces of the transparent film were formed between the light exit means. The area occupied by the flat faces in one surface of the film was 8

COMPARATIVE EXAMPLE 1

An external light-illumination reflective liquid-crystal display device using a front light was obtained in the same manner as in Example 1 except that an optical film having no anti-reflection film was used.

COMPARATIVE EXAMPLE 2

A mold different in shape was used to obtain a transparent film. In the transparent film, prism-like concave portions which were shaped substantially like triangular continuous grooves in section and which were formed in to ridgelines parallel with the widthwise direction were disposed at intervals of a pitch of 210 μm. Each concave portion had a depth in a range of from 8 to 13 μm and was constituted by an optical path changing slope A1 and a gentle slope. The inclination angle of the optical path changing slope A1 was 30 degrees. The inclination angle of the gentle slope was in a range of from 2.3 to 4.0 degrees. The difference in inclination angle between adjacent ones of the gentle slopes was not larger than 0.1 degree. The area occupied by the optical path changing slopes in one surface of the film was 10.8% of the area occupied by the gentle slopes in the surface of the film. An optical film and an external light-illumination reflective liquid-crystal display device using a front light were obtained in the same manner as in Example 1 except that the transparent film was used.

Evaluation Test

Each of the reflective liquid-crystal display devices obtained in Examples 1 and 2 and Comparative Examples 1 and 2 was observed in the condition that the cold-cathode tube was turned on in a dark room. As a result, bright display with a good illumination state was obtained in each of Examples 1 and 2 and Comparative Example 1, but bright display in an obliquely viewing direction at a large angle and dark display in the frontal direction were obtained in Comparative Example 2.

Then, the display device was observed in the condition that the cold-cathode tube was turned off under bright external light. As a result, bright display easy to view with little glare of external light due to surface reflection was obtained in each of Examples 1 and 2. Particularly in Example 2, no moire was generated. In Comparative Example 1, however, display was hard to view because of glare due to surface reflection. In Comparative Example 2, glare was weaker than that in Comparative Example 1, but prism lines due to the plurality of light exit means of the optical film were recognized so visually and clearly that display was hard to view. It is obvious from the above description that the present invention can form a reflective liquid-crystal display device in which reduction in thickness and weight can be achieved by use of a light exit means system while increase in bulk and weight due to use of a light pipe is avoided, and in which display quantity is good in each of illumination and external light modes.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical film comprising:
    a transparent film including a repetitive structure of a plurality of light exit means arranged at intervals of a regular pitch or intervals of irregular pitches in one of opposite surfaces of said transparent film, said repetitive structure of said plurality of light exit means having optical path changing slopes each inclined to said film surface at an inclination angle in a range of from 30 to 48 degrees in order to change an optical path of light from a direction of said film surface into a direction of thickness of said film; and
    an anti-reflection layer disposed on said film surface in which said plurality of light exit means are formed, wherein said anti-reflection layer exhibits a reflectance of not higher than 1.5% with respect to perpendicularly incident light with a wavelength of 550 nm, said optical film is light-transmissible in said direction of the thickness of said film, and the thickness of the transparent film is set to be not larger than 300 μm.

2. An optical film according to claim 1, further comprising an adhesive layer disposed on the other surface of said transparent film in which no light exit means are formed.

3. An optical film according to claim 2, wherein said adhesive layer is a pressure sensitive adhesive layer.

4. An optical film according to claim 1, wherein the thickness of the transparent film is 5 to 200 μm.

5. An optical film according to claim 4, wherein the thickness of the transparent film is 10 to 100 μm.

6. An optical film according to claim 1, wherein said anti-reflection layer is made of a transparent dielectric thin film which is vapor-deposited on a surface of said transparent film.

7. An optical film according to claim 1, wherein said plurality of light exit means are constituted by continuous or discontinuous prism-like structures which are formed at intervals of a pitch in a range of from 50 μm to 1.5 mm and each of which has a combination of an optical path changing slope and a gentle slope, wherein each of said optical path changing slopes is inclined downward from one side of said film to an opposite side of said film and has a projected width of not larger than 40 μm on a film plane, wherein each of said gentle slopes is inclined to said film surface at an inclination angle in a range of from 0 (exclusive) to 10 degrees, wherein a difference in inclination angle between any two of said gentle slopes is not larger than 5 degrees while a difference in inclination angle between adjacent ones of said gentle slopes is not larger than 1 degree, and wherein a projected area of said gentle slopes on said film plane is not smaller than 8 times as large as a projected area of said optical path changing slopes on said film plane.

8. An optical film according to claim 7, wherein ridgelines of said prism-like structures are parallel with one side of said film or intersect one side of said film at an angle in a range of ±35 degrees.

9. An optical film according to claim 1, wherein said plurality of light exit means are constituted by discontinuous grooves each of which has a combination of an optical path changing slope and an elevational face opposite to said optical path changing slope and each of is shaped substantially like a triangle in section; wherein each of said elevational faces is inclined to said film surface at an inclination angle of not smaller than 48 degrees; wherein each of said grooves has a length, a width and a depth, said length being not smaller than 5 times as large as said width, said depth ranging from 2 to 40 μm; and wherein said plurality of light exit means are arranged irregularly while an area occupied by said plurality of light exit means is not larger than 15% of a whole area of said film surface.

10. A reflective liquid-crystal display device comprising:
    a reflective liquid-crystal display panel including at least one light source on one of side surfaces of said liquid-crystal display panel; and
    an optical film according to claim 1 and provided on a viewing side of said reflective liquid-crystal display panel so that a surface of said optical film in which a plurality of light exit means are formed faces outward.

* * * * *